US012619526B2

(12) United States Patent
Hwang et al.

(10) Patent No.: US 12,619,526 B2
(45) Date of Patent: May 5, 2026

(54) STORAGE DEVICE, STORAGE SYSTEM, AND OPERATING METHOD OF STORAGE SYSTEM

(71) Applicant: SAMSUNG ELECTRONICS CO., LTD., Suwon-si (KR)

(72) Inventors: Jeang-Su Hwang, Suwon-si (KR); Seokha Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/804,363

(22) Filed: Aug. 14, 2024

(65) Prior Publication Data

US 2025/0123958 A1 Apr. 17, 2025

(30) Foreign Application Priority Data

Oct. 12, 2023 (KR) ........................ 10-2023-0136145
Feb. 27, 2024 (KR) ........................ 10-2024-0028143

(51) Int. Cl.
G06F 12/02 (2006.01)

(52) U.S. Cl.
CPC .................................. G06F 12/023 (2013.01)

(58) Field of Classification Search
CPC ........... G06F 12/023; G06F 2212/7203; G06F 2212/7207; G06F 12/0246
See application file for complete search history.

(56) References Cited

U.S. PATENT DOCUMENTS

| | | | | |
|---|---|---|---|---|
| 9,680,689 | B2 * | 6/2017 | Broome | ........... H04N 21/44004 |
| 10,635,580 | B2 | 4/2020 | Bordia et al. | |
| 10,642,496 | B2 | 5/2020 | Benisty et al. | |
| 10,712,949 | B2 | 7/2020 | Hahn et al. | |
| 11,281,512 | B2 | 3/2022 | Choi et al. | |
| 2005/0071599 | A1 * | 3/2005 | Modha | .................... G06F 12/12 |
| | | | | 711/170 |
| 2019/0138220 | A1 | 5/2019 | Hahn et al. | |

(Continued)

FOREIGN PATENT DOCUMENTS

| | | |
|---|---|---|
| CN | 108021511 B | 4/2021 |
| CN | 114780310 A | 7/2022 |

(Continued)

OTHER PUBLICATIONS

"PCI Express® Base Specification Revision 6.1," PCI Express, Jul. 12, 2023, total 2025 pages, Retrieved from Https://pcisig.com/specifications/pciexpress/.

(Continued)

*Primary Examiner* — Nanci N Wong
(74) *Attorney, Agent, or Firm* — Sughrue Mion, PLLC

(57) ABSTRACT

A storage system may include: a host device including a host memory and configured to: set a size of a host memory buffer (HMB) based on an HMB ID indicating the size of the HMB; and allocate a portion of the host memory as the HMB, the portion corresponding to the size of the HMB. The storage system may further include a storage device including a non-volatile memory and configured to: generate the HMB ID indicating the size of the HMB, which is based on capacity of the non-volatile memory and communication speed between the host device and the storage device; and transmit the HMB ID to the host device.

13 Claims, 15 Drawing Sheets

(56) References Cited

U.S. PATENT DOCUMENTS

| 2019/0146709 | A1* | 5/2019 | Im | G06F 3/0685 |
| | | | | 711/103 |
| 2019/0294350 | A1* | 9/2019 | Hahn | G06F 3/0656 |
| 2020/0012595 | A1 | 1/2020 | Bordia et al. | |
| 2020/0142766 | A1 | 5/2020 | Choi et al. | |
| 2021/0334200 | A1 | 10/2021 | Xu | |
| 2023/0112869 | A1 | 4/2023 | Hwang et al. | |
| 2023/0418514 | A1* | 12/2023 | Zamir | G06F 3/0656 |
| 2024/0111646 | A1* | 4/2024 | Benisty | G06F 11/3452 |

FOREIGN PATENT DOCUMENTS

| CN | 111149096 B | 8/2023 |
| KR | 10-2023-0051335 A | 4/2023 |
| KR | 10-2555511 B1 | 7/2023 |

OTHER PUBLICATIONS

Server and Infrastructure Engineering, "Next-Generation Dell PowerEdge Servers: Designed with PCIe Gen 5 to Deliver Future-Ready Bandwidth," Dell Technologies, total 2 pages, copyright year 2023, Retrieved from Https://infohub.delltechnologies.com/p/next-generation-dell-poweredgeservers-designed-woth-pcie-gen-5-to-deliver-future-ready-bandwidth/.

Bouse et al., "How the Doubling of Interconnect Bandwidth with PCI Express® 6.0 Impacts IP Electrical Validation," Synopsys®, Tektronix®, White Paper, Retrieved on May 27, 2024 , total 7 pages.

"NVME Express," nvm Express, Revision 1.2, Nov. 3, 2014, total 205 pages.

"test_kernelv2," Linux kernel/block multi queue, NVMe Device Driver Initializing Flow, Oct. 26, 2021, total 4 pages.

Kim et al., "Performance Evaluation of HMB-Supported DRAM-Less NVMe SSDs," KIPS Trans. Comp. and Comm. Sys. vol. 8, No. 7, pp. 159-166, 2019.

Yang, "Improving the Design of DRAM-Less PCIe SSD", Flash Memory Summit 2017, Session 101-A: Consumer Applications, 2017, total 16 pages.

* cited by examiner

Figure 11:
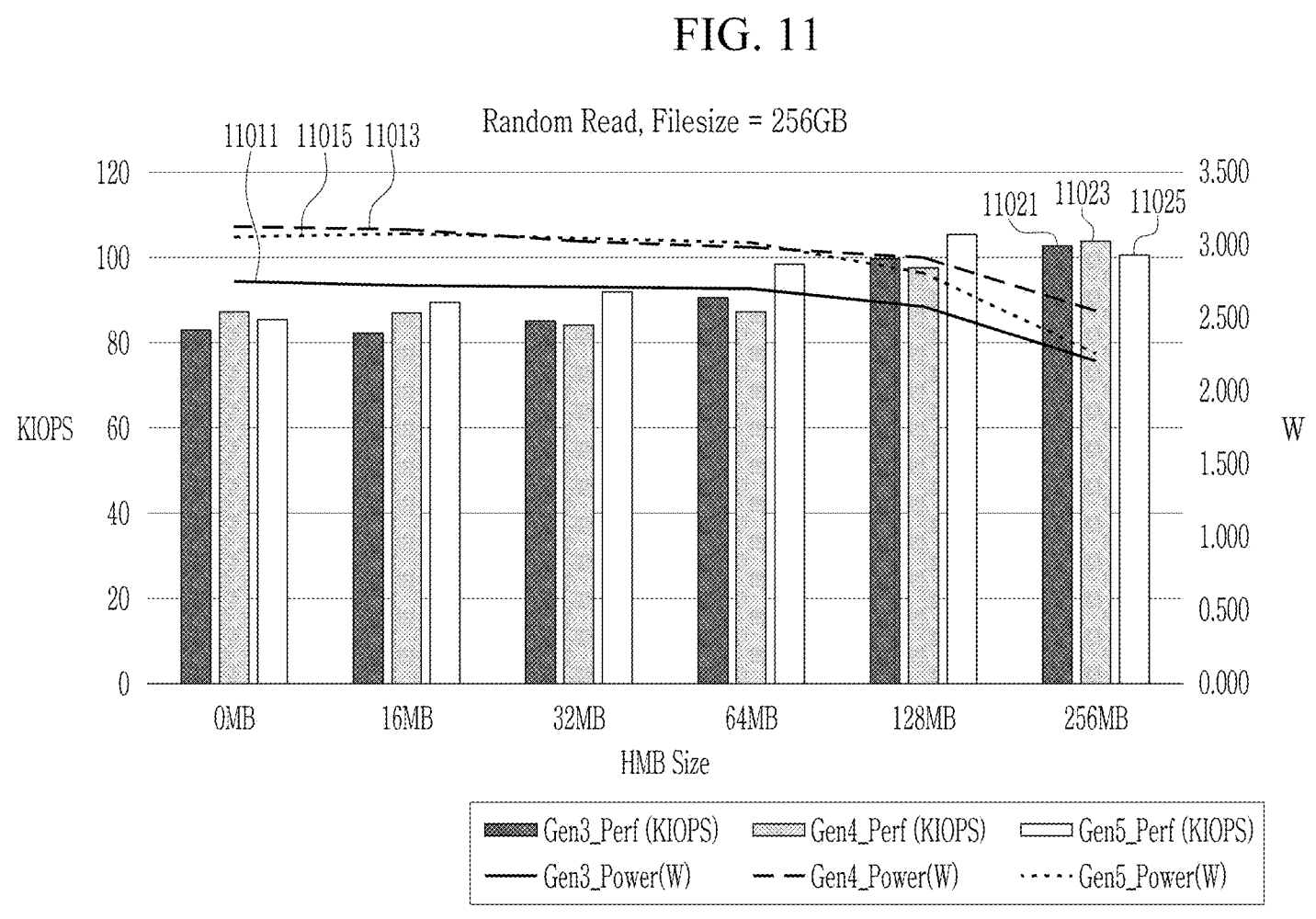

Random Read, Filesize = 256GB

HMB Size

KIOPS

W

Gen3_Perf (KIOPS)
Gen3_Power(W)
Gen4_Perf (KIOPS)
Gen4_Power(W)
Gen5_Perf (KIOPS)
Gen5_Power(W)

STORAGE DEVICE, STORAGE SYSTEM, AND OPERATING METHOD OF STORAGE SYSTEM

CROSS-REFERENCE TO RELATED APPLICATIONS

This application claims priority to and the benefit of Korean Patent Application No. 10-2023-0136145 filed in the Korean Intellectual Property Office on Oct. 12, 2023, and Korean Patent Application No. 10-2024-0028143 filed in the Korean Intellectual Property Office on Feb. 27, 2024, the entire contents of which are incorporated herein by reference.

BACKGROUND

1. Field

This disclosure relates to a storage device, a storage system including the same, and an operating method of the storage system.

2. Description of the Related Art

As various electronic devices are used by many people and large amounts of data are generated, storage devices require large amounts of resources to handle the data. For example, as the amount of data increases, the amount of metadata associated with the data may also increase. The storage device may require a sufficient amount of memory to buffer the increased amount of data and metadata. However, it can be difficult to implement a storage device with sufficient resources due to various issues such as cost, device size, design limitations, etc.

Meanwhile, recently, peripheral component interconnect express (PCIe)-based non-volatile memory express (NVMe) and UFS-based unified memory extension (UME) are being actively researched and applied to storage devices. The interface provides memory sharing functions between devices. For example, a host may allocate a portion of a memory region within the host to a storage device, and the allocated memory region may be referred to as a host memory buffer (HMB).

SUMMARY

The present disclosure attempts to provide a storage system including an HMB with an appropriate size.

According to one or more example embodiments, a storage system may include: a host device including a host memory and configured to: set a size of a host memory buffer (HMB) based on an HMB ID indicating the size of the HMB; and allocate a portion of the host memory as the HMB, the portion corresponding to the size of the HMB. The storage system may further include a storage device including a non-volatile memory and configured to: generate the HMB ID indicating the size of the HMB, which is based on capacity of the non-volatile memory and communication speed between the host device and the storage device; and transmit the HMB ID to the host device.

According to one or more example embodiments, a storage device may include: a host interface connected to a host device and configured to transmit and receive a plurality of packets; a non-volatile memory; and a host memory buffer (HMB) controller configured to: monitor communication speed between the storage device and the host device, to determine a size of an HMB region allocated from the host device based on the communication speed; buffer metadata for the non-volatile memory in the HMB region; and instruct the host interface to transmit the size of the HMB region to the host device.

According to one or more example embodiments, an operating method of a storage system may include: establishing communication with a host device including a host memory; determining a host memory buffer (HMB) ID instructing the host device to allocate a portion of the host memory as an HMB region having a size based on communication speed between the host device and a storage device; transmitting an asynchronous event request (AER) requesting allocation of the HMB region to the host device; and accessing the HMB region allocated based on the HMB ID.

According to one or more example embodiments, a host device may include: memory storing instructions, and having a portion thereof allocated as a host memory buffer (HMB); and at least one processor operatively connected to the memory and configured to execute the instructions to: receive a HMB ID indicating a size of the HMB, from a storage device, the size of the HMB being based on capacity of the storage device and communication speed between the host device and the storage device; set the size of the HMB based on the HMB ID; and allocate the portion of the memory as the HMB, the portion corresponding to the size of the HMB.

BRIEF DESCRIPTION OF THE DRAWINGS

Embodiments will be more clearly understood from the following detailed description taken in conjunction with the accompanying drawings in which:

FIG. 1 illustrates a storage system according to one or more embodiments;

FIG. 11 is a graph illustrating performance and power according to HMB size and speed according to one or more embodiments;

DETAILED DESCRIPTION

Figure 2:
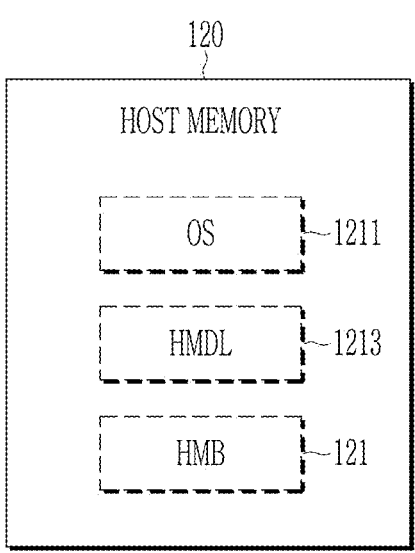
FIG. 2 illustrates data loaded into a host memory according to one or more embodiments.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. In the flowchart described with reference to drawings in this description, the operation order may be changed, several operations may be merged, certain operations may be divided, and specific operations may not be performed.

In the description, expressions described in the singular in this specification may be interpreted as the singular or plural unless an explicit expression such as "one" or "single" is used. While terms including ordinal numbers, such as "first" and "second," etc., may be used to describe various components, such components are not limited to the above terms. These terms are only used to distinguish one constituent element from another constituent element.

Figure 1:
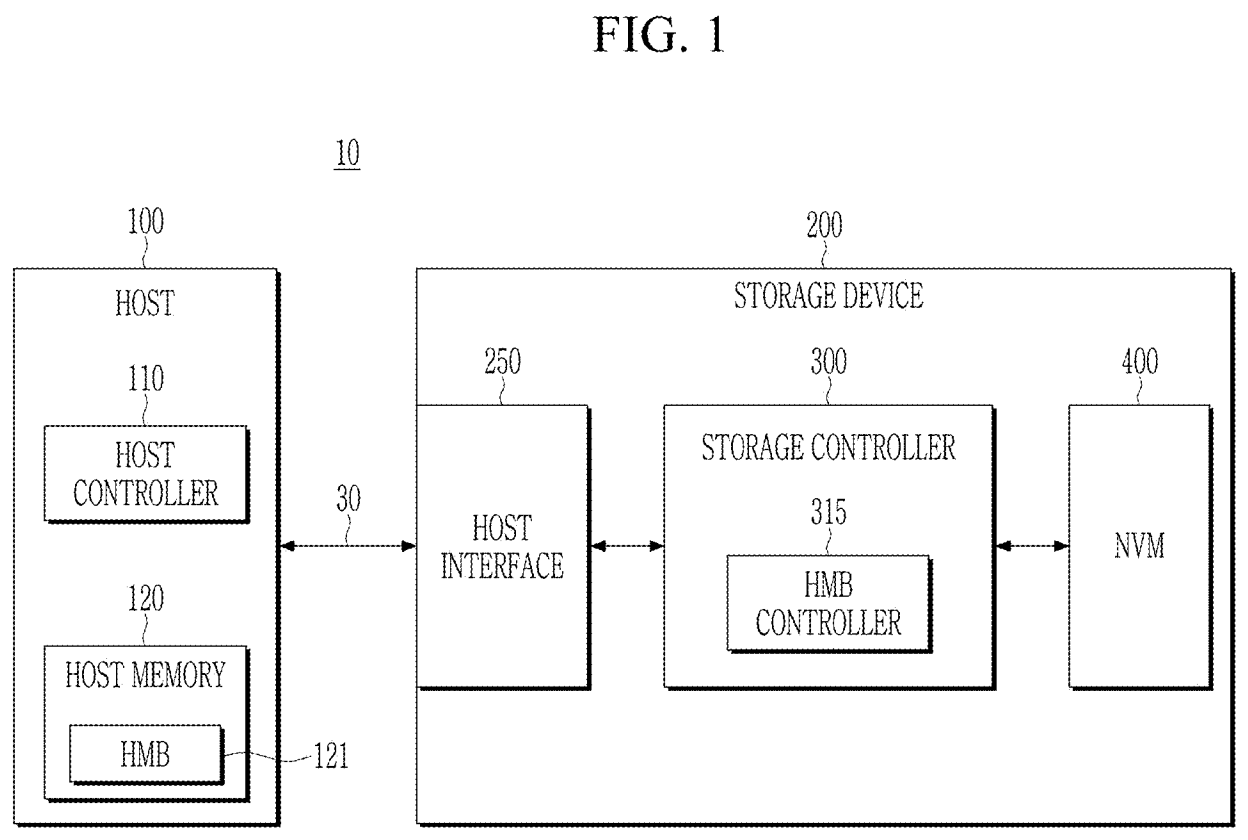

FIG. 1 illustrates a storage system according to one or more embodiments.

In one or more embodiments, a storage system 10 may be included in user devices such as a personal computer, laptop computer, server, media player, digital camera, or the like, or in automotive devices such as navigation, black box, automotive electronic device. Alternatively, the storage system 10 may be included in a mobile system such as a mobile phone, a smart phone, a tablet personal computer (PC), a wearable device, a healthcare device or an internet of things (IoT) device.

As shown in FIG. 1, the storage system 10 includes a host device 100 and a storage device 200.

The host device 100 may control the overall operation of the storage system 10. For example, the host device 100 may store data in the storage device 200 or transmit a request to the storage device 200 to read data stored in the storage device 200. In some embodiments, the host device 100 may be a processor core, such as a central processing unit (CPU), an application processor (AP), configured to control the storage system 10, or a computing node connected through a network.

The host device 100 may communicate with the storage device 200. For example, the host device 100 may communicate with the storage device 200 through various interfaces such as universal serial bus (USB), multi media card (MMC), PCI Express (PCI-E), AT Attachment (ATA), serial AT attachment (SATA), parallel AT attachment (PATA), small computer system (SCSI), serial attached SCSI (SAS), enhanced small disk interface (ESDI), integrated drive electronics (IDE), non-volatile memory express (NVMe), etc.

Specifically, the host device 100 may communicate with the storage device 200 through the link 30. For example, the link 30 may correspond to a dual-simplex communication channel between the host device 100 and the storage device 200. The link 30 includes at least one pair of transmission path and reception path, where one pair of transmission path and reception path may be defined as a lane. The link 30 may aggregate a plurality of lanes to expand bandwidth. The number of lanes forming one link may be defined as link width. The data clock used in link 30 may be embedded using several encoding schemes to achieve high interfacing rates (i.e., communication speed). The lanes included in the link 30 may be represented by xN (where N is the width of the lane).

For example, the PCIe method may support Gen 1 to Gen 5. Gen 1 to Gen 5 may be classified according to data communication speed. Gen 1 may provide 250 MB/s per lane, and Gen 2 may provide 500 MB/s per lane. Gen 3 may change the encoding scheme from 8 b/10 b to 128 b/130 b and provide 984.6 MB/s per lane, Gen 4 may provide 1969 MB/s per lane, and Gen 5 may provide 3938 MB/s per lane. Meanwhile, lanes supported by PCIe may be x1, x2, x4, x8, and x16. In hardware initialization step, the link 30 may be appropriately set according to negotiation of the lane width and operating frequency by the host device 100 and the storage device 200. For example, the link 30 may be set through link number negotiation, lane number negotiation, etc. As the link 30 is set, the communication speed between the host device 100 and the storage device 200 may be determined. Each link may support a symmetrical number of lanes in each direction. For example, an x16 link may have 16 differential signal pairs in each direction.

The host device 100 may include a host controller 110 and a host memory 120. In some embodiments, the host controller 110 and host memory 120 may be implemented as separate semiconductor chips. In some embodiments, the host controller 110 and host memory 120 may be integrated on the same semiconductor chip.

The host controller 110 may be a device configured to control overall operations of the host device 100 or the storage device 200.

In some embodiments, the host controller 110 may be one of a plurality of modules included in an application processor, and the application processor may be implemented as a system on chip (SoC).

The host memory 120 may be a buffer memory, cache memory, or operating memory used in the host device 100. For example, the host controller 110 may store write data in the buffer region of the host memory 120 in order to write the write data to the storage device 200. For example, the host controller 110 may read data stored in the storage device 200 and store the data in the buffer region of the host memory 120. Additionally, various software or data running on the host device 100 may be loaded into the host memory 120.

The host memory 120 may include a host memory buffer (HMB) 121. In some embodiments, the host device 100 may allocate a portion of the host memory 120 as the HMB 121. The HMB 121 may be a region of the host memory 120 allocated to the storage device 200. HMB 121 may be controlled by the storage device 200. HMB 121 may be monitored by storage device 200.

In some embodiments, the host device 100 may allocate a region of the HMB 121 based on the HMB ID received from the storage device 200. The HMB ID may include information necessary for the host device 100 to properly allocate the HMB 121. For example, the HMB ID may include at least one of the minimum size of the HMB 121, the maximum size of the HMB 121, target workload size, communication speed, and PCIe bandwidth. In some embodiments, the HMB ID may include a target size to which the HMB 121 should be allocated.

The HMB 121 may store data of the storage device 200. For example, HMB 121 may store metadata of the storage device 200. The metadata may include mapping data including mapping information between the logical address of the host device 100 and the physical address of the storage device 200.

The storage device 200 may operate according to requests from the host device 100. For example, the storage device 200 may write data to a non-volatile memory 400 or read data stored in the non-volatile memory 400 under the control of the host device 100. Meanwhile, the storage device 200 may update metadata necessary to process a request from the host device 100.

The storage device 200 may include storage media for storing data. For example, the storage device 200 may be implemented in the form of a solid-state drive (SSD), a smart SSD, an embedded multimedia card (eMMC), an embedded universal flash storage (UFS) memory device, a UFS memory card, a compact flash (CF), secure digital (SD), micro secure digital (Micro-SD), mini secure digital (Mini-SD), extreme digital (xD), memory stick, or similar forms.

The storage device 200 may include a host interface 250, a storage controller 300, and non-volatile memory 400.

The host interface 250 may transmit and receive a plurality of packets with the host device 100. In some embodiments, the host interface 250 may communicate with the host device 100 according to at least one of various interface protocols, such as an advanced technology attachment (ATA) interface, a serial ATA (SATA) interface, an external SATA (e-SATA) interface, a small computer small interface (SCSI) interface, a serial attached SCSI (SAS) interface, peripheral component interconnection (PCI) interface, PCI express (PCIe) interface, NVM express (NVMe) interface, IEEE 1394, universal serial bus (USB) interface, secure digital (SD) card, multi-media card (MMC) interface, an embedded multi-media card (eMMC) interface, a universal flash storage (UFS) interface, an embedded universal flash storage (eUFS) interface, a compact flash (CF) card interface, or a network interface.

A packet transmitted from the host device 100 to a host interface 250 may include a command or data to be written to the non-volatile memory 400. A packet transmitted from the host interface 250 to the host device 100 may include a response to a command or data read from the non-volatile memory 400.

In some embodiments, the host interface 250 may have an interfacing protocol that allows the HMB 121 to support the buffer function of the storage device 200. The storage controller 300 may control the HMB 121 through the host interface 250.

The storage controller 300 may control the operation of the storage device 200. For example, the storage controller 300 may perform various management operations to efficiently use the non-volatile memory 400. The storage controller 300 may write data to the non-volatile memory 400 according to a request from the host device 100.

The storage controller 300 may include an HMB controller 315. The HMB controller 315 may manage the HMB 121. The HMB controller 315 may monitor the communication speed between the host device 100 and the storage device 200. The HMB controller 315 may generate an HMB ID based on the monitoring results.

Specifically, the HMB controller 315 may determine the target size of the HMB 121 based on the communication speed. The HMB controller 315 may transmit the determined size of the HMB 121 to the host device 100 as an HMB ID. The host device 100 may set the size of the HMB 121 and allocate a portion of the host memory 120 as a region of the HMB 121 based on the HMB ID.

In some embodiments, the HMB controller 315 may change the target size of HMB 121 based on changes in communication speed. In some embodiments, the HMB controller 315 may notify the host device 100 that the size of HMB 121 has changed. Accordingly, the host device 100 may reallocate the region of the HMB 121 in the host memory 120.

Meanwhile, the HMB controller 315 may generate an HMB ID based on the capacity of the non-volatile memory 400.

The non-volatile memory 400 may include a plurality of dies or a plurality of chips including a memory cell array. For example, the non-volatile memory 400 may include a plurality of chips, and each of the plurality of chips may include a plurality of dies. In some embodiments, the non-volatile memory 400 may also include a plurality of channels, each including a plurality of chips.

The non-volatile memory 400 may include NAND flash memory. In other embodiments, the non-volatile memory 400 may include electrically erasable programmable read-only memory (EEPROM), phase change random access memory (PRAM), resistive RAM (ReRAM), resistance random access memory (RRAM), nano floating gate memory (NFGM), polymer random access memory (PoRAM), magnetic random-access memory (MRAM), ferroelectric random-access memory (FRAM), or similar memory. Hereinafter, in the present disclosure, the non-volatile memory 400 will be described assuming that it is a NAND flash memory device.

FIG. 2 illustrates data loaded into a host memory according to one or more embodiments.

Various software or data running on the host device 100 may be loaded into the host memory 120. The host memory 120 may store or output data requested by the host controller 110.

For example, as shown in FIG. 2, an operating system (OS) 1211 may be loaded into the host memory 120. The host controller 110 may control the overall operation of the host device 100 by running the OS 1211.

The host memory 120 may include the HMB 121. The host controller 110 may allocate a portion of the host memory 120 to the HMB 121. The host controller 110 may allocate the HMB 121 based on the HMB ID received from the storage device 200. Specifically, the host controller 110 may determine an address to be allocated to the HMB 121 in the host memory 120 so that the HMB 121 has a size corresponding to the target size. In some embodiments, consecutive addresses may be allocated to the HMB 121.

The host memory 120 may include a host memory descriptor list (HMDL) 1213. Specifically, the host controller 110 may allocate the HMB 121 and generate the HMDL 1213 including information about the HMB 121. For example, the HMDL 1213 may include the address and location allocated to the HMB 121. Specifically, the HMDL 1213 may include the start address and end address of the HMB 121. When the HMB 121 is allocated to a plurality of discontinuous chunks, the HMDL may include a start address and an end address of each of the plurality of chunks of the HMB 121.

Figure 3:
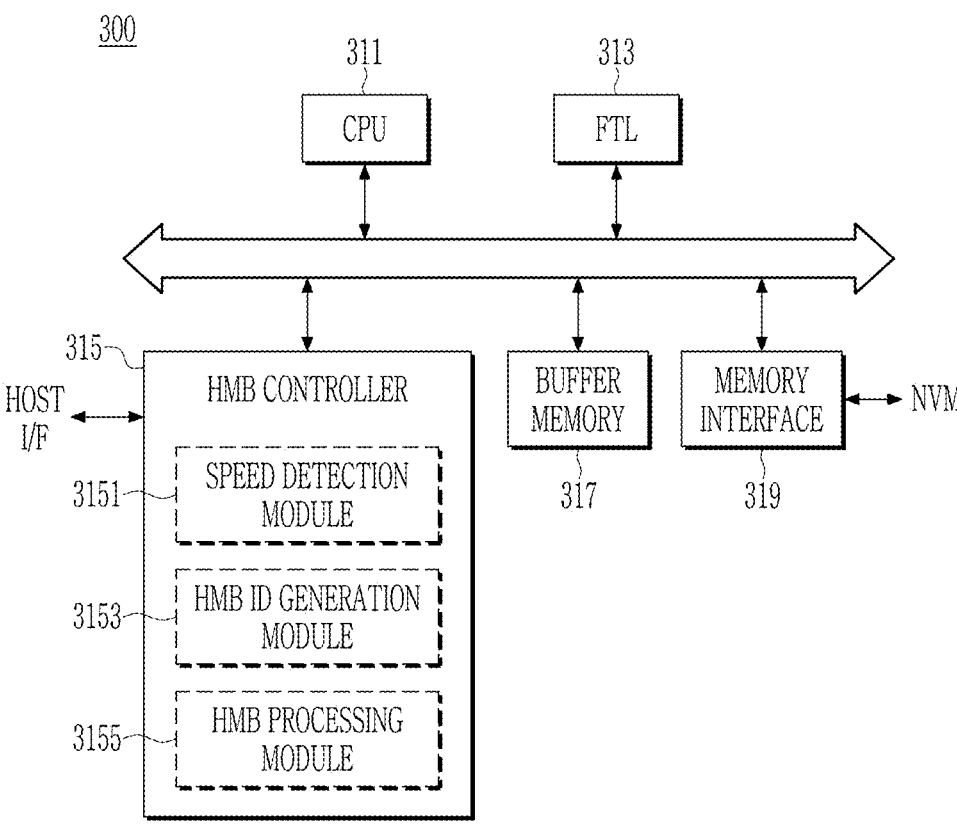
FIG. 3 illustrates a storage controller according to one or more embodiments.

FIG. 3 illustrates a storage controller according to one or more embodiments.

As shown in FIG. 3, the storage controller 300 may include the CPU 311, the flash translate layer (FTL) 313, the HMB controller 315, a buffer memory 317, and a memory interface 319.

The CPU 311 may control overall operations of the storage controller 300. The CPU 311 may perform various memory management operations of the storage device 200.

For example, the CPU 311 may control the FTL 313, HMB controller 315, buffer memory 317, and memory interface 319 to respond to requests received from the host device 100 and write data to the non-volatile memory 400. Specifically, the CPU 311 may control the memory interface 319 to transfer write data to the non-volatile memory 400. Meanwhile, the FTL 313 may map the logical address of the host device 100 to the physical address of the non-volatile memory 400 and generate mapping data. Mapping data may be buffered in the HMB controller 315 or buffer memory 317.

Meanwhile, the CPU 311 may set the operation of the storage device 200 based on the HMB ID. For example, the CPU 311 may control the HMB controller 315 or the buffer memory 317 so that metadata is flushed to the non-volatile memory 400. While the storage device 200 is running, metadata may be flushed to the non-volatile memory 400 periodically or aperiodically. In some embodiments, the CPU 311 may set the size of metadata flushed to non-volatile memory 400. For example, the CPU 311 may set the size of metadata flushed at a time to increase as the HMB size increases.

The CPU 311 may control the HMB controller 315 to buffer data in the HMB 121. In some embodiments, the CPU 311 may control the HMB controller 315 to output the HMB ID generated by the HMB controller 315 to the host device 100.

The FTL 313 may perform various maintenance operations to efficiently use the non-volatile memory 400.

Specifically, the FTL 313 may perform several functions such as address mapping, wear-leveling, and garbage collection. The address mapping operation may be an operation of changing a logical address received from the host device 100 into a physical address used to actually store data in the non-volatile memory 400.

Wear-leveling may be an operation that equalizes the usage frequency or usage count of the plurality of the memory blocks included in the non-volatile memory 400 by ensuring that the blocks within the non-volatile memory 400 are used uniformly, thereby preventing excessive degradation of specific blocks. Garbage collection may be an operation to secure usable size in the non-volatile memory 400 by copying valid data of a block to a new block and then erasing the existing block.

In some embodiments, the FTL 313 may be implemented in software or hardware form. When the FTL 313 is implemented in software form, program code or information related to the FTL 313 may be stored in the buffer memory 317 and executed by the CPU 311. When the FTL 313 is implemented in hardware form, a hardware accelerator configured to perform the operation of the FTL 313 may be provided separately from the CPU 311.

The HMB controller 315 may generate information necessary for the host device 100 to set the HMB 121. The HMB controller 315 may manage the HMB 121.

The HMB controller 315 may include a speed detection module 3151, an HMB ID generation module 3153, and an HMB processing module 3155.

The speed detection module 3151 may detect the communication speed determined by establishing communication between the host device 100 and the storage device 200. In some embodiments, the speed detection module 3151 may detect the initial communication speed according to the link 30 set in the hardware initialization step.

For example, the storage device 200 may be hardware initialized when power is turned on. In some embodiments, the storage device 200 may be powered on based on activation of an external power voltage. The external power voltage may be provided from the host device 100 or may be provided from a separate power supply device. For example, the storage device 200 may be hardware initialized when the storage system 10 is initialized or when the storage system 10 is restored from a power saving mode to a normal mode.

When the storage device 200 is hardware initialized, the link 30 may be set by establishing communication (or communication connection, link establishment, link connection) between the storage device 200 and the host device 100. The link 30 may be set based on an interfacing method between the host device 100 and the storage device 200. The speed detection module 3151 may detect the initial communication speed determined based on the predetermined link 30.

In some embodiments, the speed detection module 3151 may monitor communication speed. For example, the speed detection module 3151 may detect the communication speed at a certain period.

When the communication speed changes, the speed detection module 3151 may generate a change signal indicating that the communication speed has changed. The speed detection module 3151 may output a change signal to the HMB ID generation module 3153. For example, when input-output (IO) noise increases between the storage device 200 and the host device 100, the communication speed may change.

The HMB ID generation module 3153 may generate an HMB ID. In some embodiments, the HMB ID generation module 3153 may generate an HMB ID based on the predetermined HMB size data. The HMB size data may include data on a HMB size corresponding to the communication speed detected by the speed detection module 3151 and the capacity of the non-volatile memory 400. HMB size data may be pre-stored in the HMB ID generation module 3153.

For example, in HMB size data, a fast communication speed may correspond to a larger HMB size compared to the HMB size when the communication speed is slow. In other words, the faster the communication speed, the larger the HMB size may correspond to.

Specifically, when a request is received from the host device 100, the storage device 200 may update metadata corresponding to the request. The storage device 200 may consume power to perform operations of reading metadata stored in non-volatile memory 400 and buffering the read data in the HMB 121 or the buffer memory 317. Meanwhile, as the communication speed between the host device 100 and the storage device 200 increases, the number of requests received per unit time may increase. Accordingly, the storage device 200 may update metadata more quickly to process received requests. At this time, as the size of data that may be buffered in the HMB 121 increases (i.e., as the size of the HMB 121 increases), the request processing speed of the storage device 200 may become faster. Therefore, as the communication speed increases, it may be helpful to increase the HMB size.

On the other hand, as the communication speed becomes slower, the number of requests received per unit time may decrease. Accordingly, the storage device 200 may update metadata slowly. At this time, even if the size of data that may be buffered in the HMB 121 is small, the impact on the request processing speed of the storage device 200 may be small. Therefore, when the communication speed slows, it may be helpful to reduce the HMB size.

Additionally, in the HMB size data, when the size of the non-volatile memory 400 is large, a larger HMB size may correspond to the HMB size when the size of the non-volatile memory 400 is small. That is, the larger the size of the non-volatile memory 400, the larger the HMB size may correspond to.

Specifically, as the capacity of the non-volatile memory 400 increases, the size of metadata may also increase. When the communication speed is the same, as the HMB size increases, the size of data that may be buffered in the HMB 121 may increase, so the request processing speed of the storage device 200 may increase. Accordingly, as the capacity of the non-volatile memory 400 increases, it may be helpful to increase the HMB size.

Additionally, as the capacity of the non-volatile memory 400 decreases, the size of metadata may decrease. Since the size of data that must be buffered in the HMB 121 may become smaller, it may be helpful for the HMB size to be smaller as the capacity of the non-volatile memory 400 becomes smaller when the communication speed is the same.

In some embodiments, the HMB ID generation module 3153 may determine whether to change the HMB ID when receiving a change signal from the speed detection module 3151. If the HMB ID generation module 3153 determines that a change is necessary, the HMB ID generation module 3153 may generate a target HMB ID based on the communication speed and the capacity of the non-volatile memory 400. If the HMB ID generation module 3153 determines that no change is necessary, the HMB ID generation module 3153 may maintain the current HMB ID.

The HMB ID generation module 3153 may output the generated HMB ID to the host device 100 under the control of the CPU 311. In some embodiments, the HMB ID generation module 3153 may output the target HMB ID to the host device 100 when generating a target HMB ID that is different from the current HMB ID.

The HMB processing module 3155 may store and manage various data associated with the HMB 121. The HMB processing module 3155 may encode data to ensure data reliability or security. For example, the HMB processing module 3155 may perform an encoding operation on data based on a data processing policy (or algorithm). The HMB processing module 3155 may store encoded data in the HMB 121.

The HMB processing module 3155 may read data stored in the HMB 121. That is, the HMB processing module 3155 may receive read data from the HMB 121. When the read data is encoded, the HMB processing module 3155 may perform a decoding operation on the read data.

The buffer memory 317 may buffer various data used in the operation of the storage device 200. In some embodiments, the buffer memory 317 may buffer metadata. For example, metadata may include mapping data referenced to perform conversion between an address provided from the host device 100 and a physical address on the non-volatile memory 400, error correction code (ECC) data referenced to detect and correct errors in data output from the non-volatile memory 400, and state data related to the state of each non-volatile memory 400. For example, the buffer memory 317 may include volatile memory such as SRAM, DRAM, SDRAM, and/or non-volatile memory such as PRAM, MRAM, ReRAM, FRAM, etc.

In some embodiments, the storage device 200 may allocate a portion of the host memory 120 of the host device 100 as the HMB 121 and use the HMB 121 in the same manner as the internal buffer memory.

The memory interface 319 may provide signal transmission and reception with the non-volatile memory 400. In some embodiments, the memory interface 319 may communicate with the non-volatile memory 400 through at least one of various interface protocols, such as a toggle interface, an ONFI interface, etc.

The memory interface 319 may transmit commands and control signals along with data to be written to the non-volatile memory 400 to the non-volatile memory 400, or may receive data read from the non-volatile memory 400.

Figure 4:
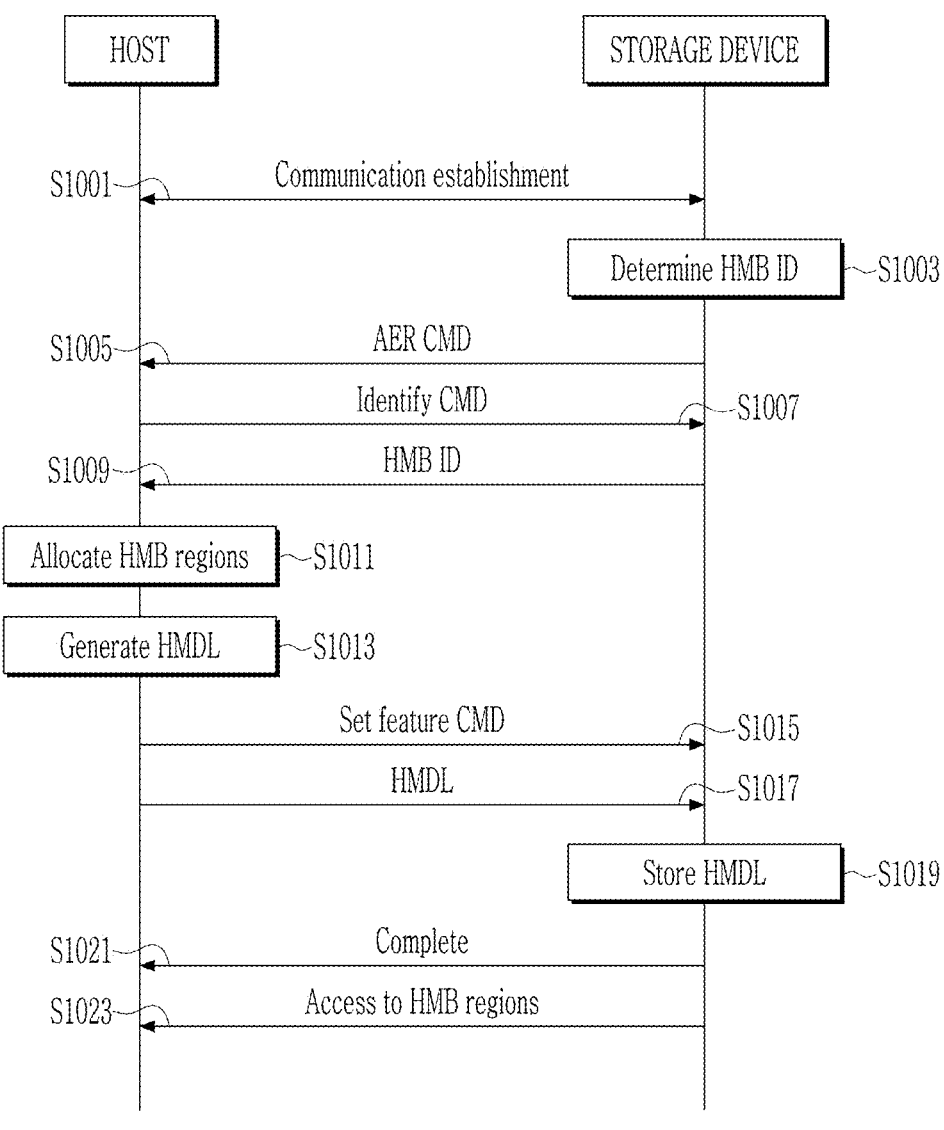
FIG. 4 illustrates an operating method of a storage system according to one or more embodiments.

FIG. 4 illustrates an operating method of a storage system according to one or more embodiments.

First, the host device 100 and the storage device 200 establish communication (S1001).

Specifically, the host device 100 and the storage device 200 may set a link based on negotiation of lane width and operating frequency when establishing communication. The initial communication speed between the host device 100 and the storage device 200 may be determined based on the predetermined link.

The storage device 200 determines the HMB ID (S1003).

Specifically, the storage device 200 may determine the HMB ID based on the initial communication speed.

The storage device 200 transmits an asynchronous event request (AER) to the storage device 200 (S1005).

Specifically, the storage device 200 may make necessary requests to the host device 100 using AER. For example, the storage device 200 may request the host device 100 to allocate the HMB 121.

The host device 100 transmits an identify command to the storage device 200 (S1007).

Specifically, the identify command may be a command for obtaining information necessary for allocation of the HMB 121. For example, the identify command may be a command to obtain an HMB ID.

In response to receiving the identify command from the host device 100, the storage device 200 transmits the HMB ID to the host device 100 (S1009).

The host device 100 allocates the HMB 121 region (S1011).

Specifically, the host device 100 may allocate a portion of the region of the host memory 120 to the HMB 121 based on the received HMB ID.

The host device 100 generates HMDL (S1013).

The host device 100 transmits a set feature command to the storage device 200 (S1015).

The set feature command may be a command to enable the HMB 121. The set feature command may further include address information of a region in the host memory 120 where the HMDL is stored.

The host device 100 transmits the HMDL to the storage device 200 (S1017).

The storage device 200 stores HMDL (S1019).

Afterwards, the storage device 200 transmits a completion response to the host device 100 (S1021).

The storage device 200 accesses the HMB 121 region (S1023).

Specifically, the storage device 200 may use the HMB 121 as a buffer based on the stored HMDL. For example, the storage device 200 may store metadata in the HMB 121.

The storage device 200 may perform internal operations using data obtained from the HMB 121. For example, the storage device 200 may control the non-volatile memory 400 using data obtained from the HMB 121.

In FIG. 4, it is described that the storage device 200 requests allocation of the HMB 121 to the host device 100 and transmits the HMB ID. However, the present disclosure is not limited thereto, and the host device 100 may determine the allocation and size of HMB 121 when initializing with the storage device 200 (e.g., power-on). The host device 100 may transmit the determination result to the storage device 200. In other words, the HMB region may not be allocated by the request of the storage device 200, but may be allocated by the determination of the host device 100.

Figure 5:
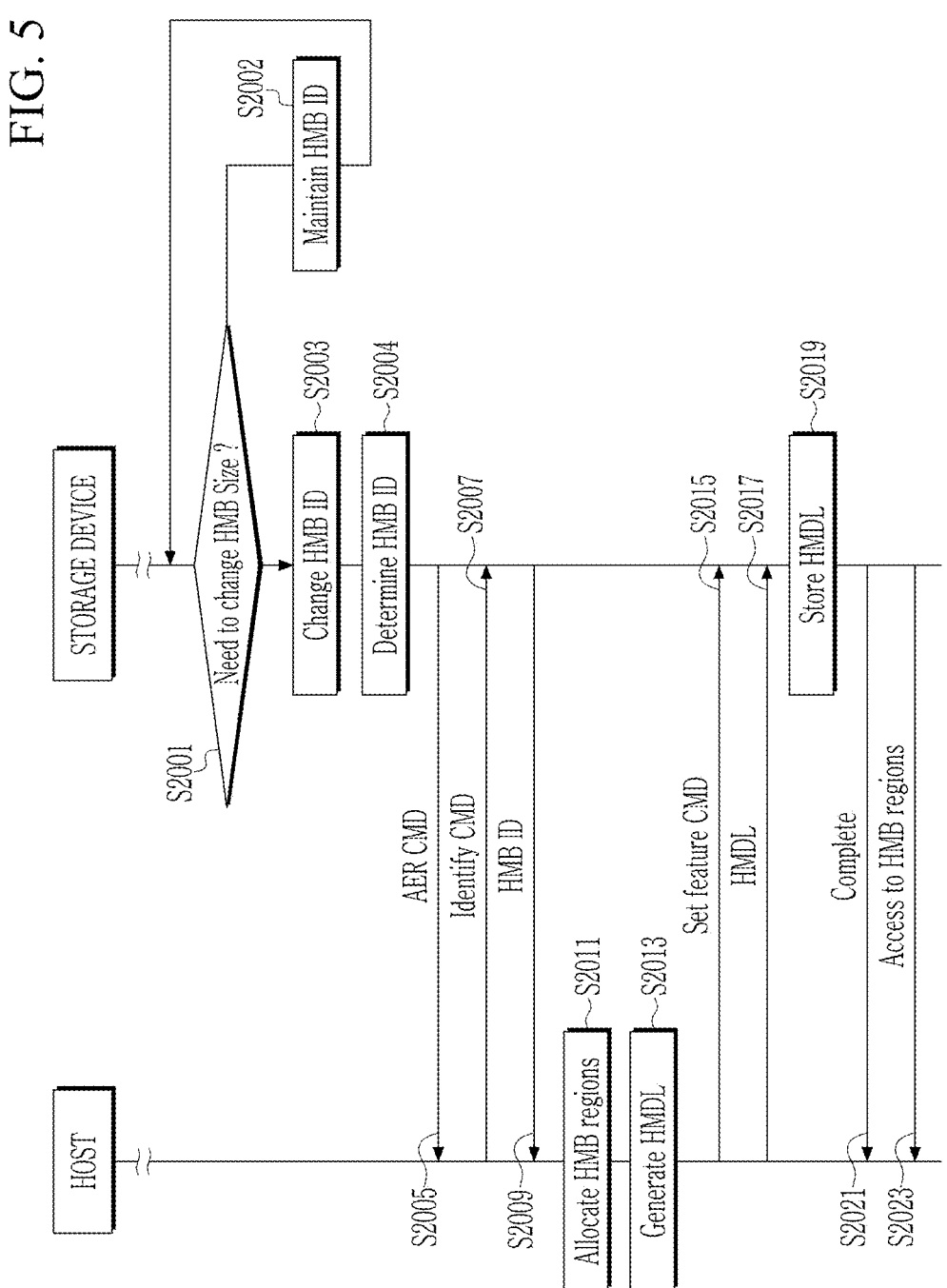
FIG. 5 illustrates an operating method of a storage system according to one or more embodiments.
Figure 6:
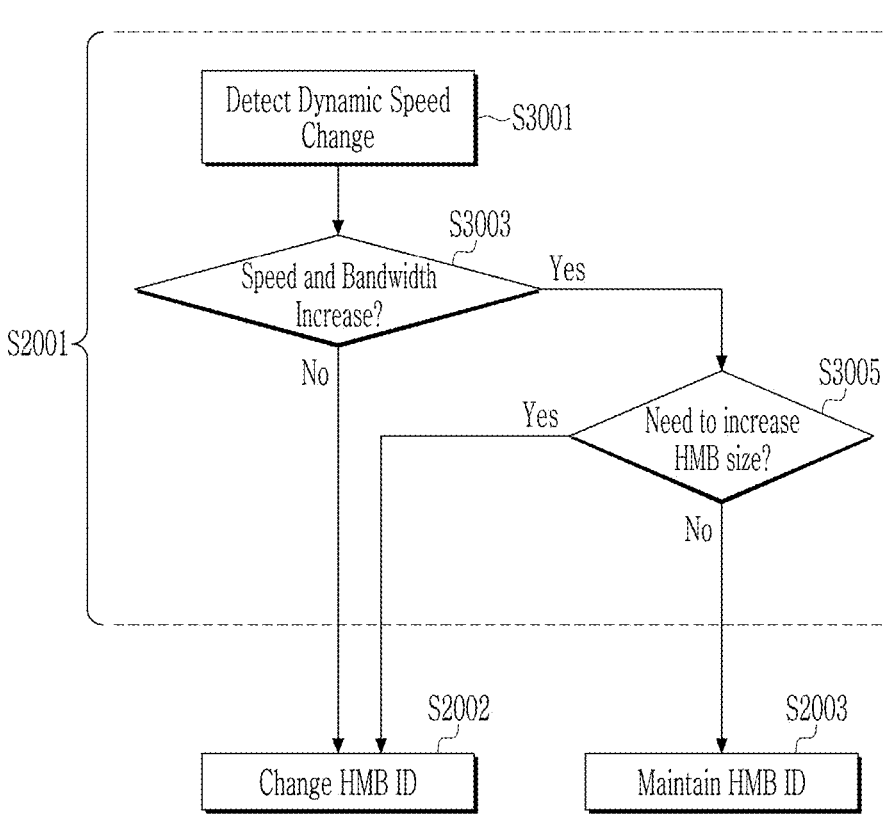
FIG. 6 illustrates step S2001 of FIG. 5.
Figure 7:
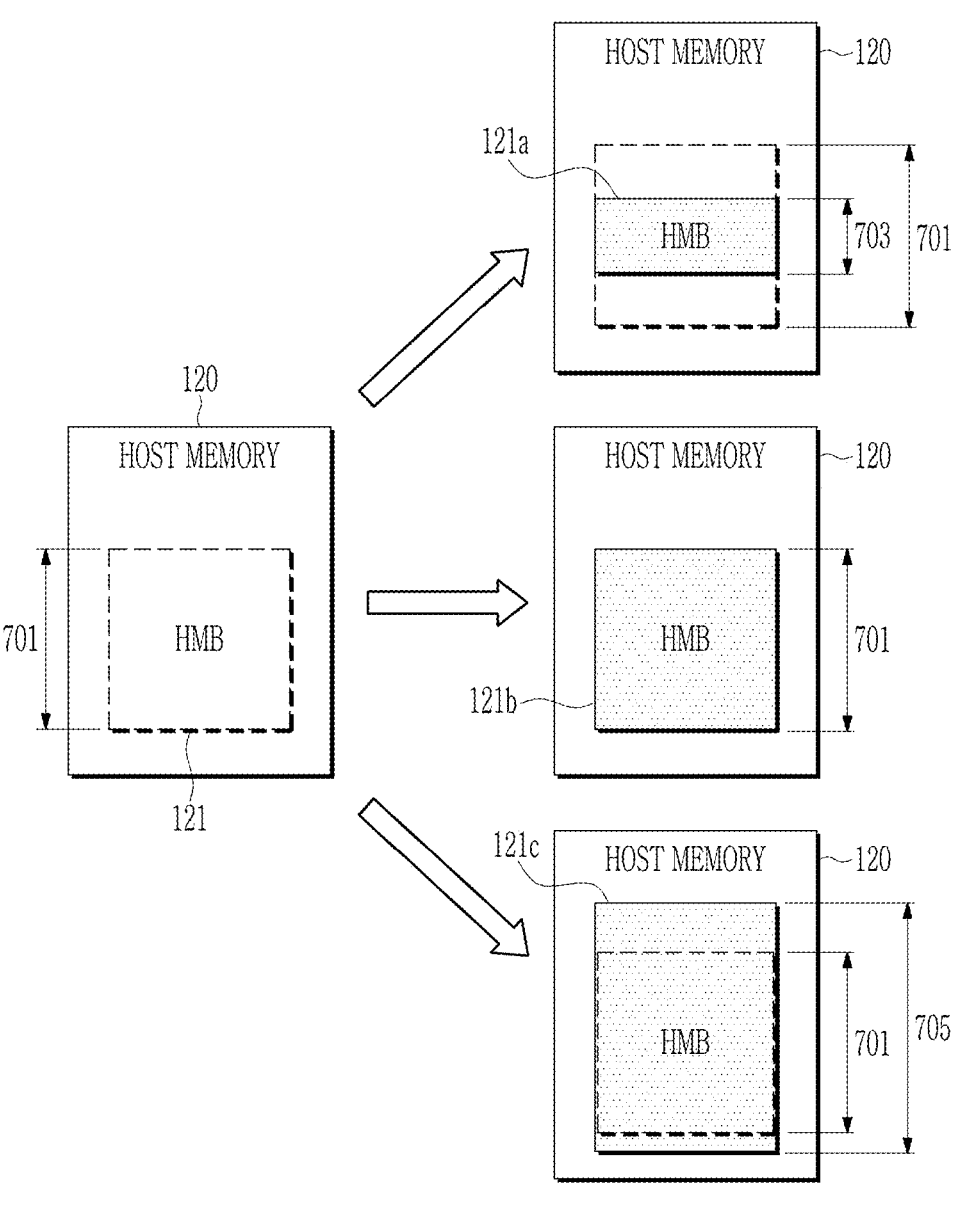
FIG. 7 illustrates the HMB region of a host device according to one or more embodiments.

FIG. 5 illustrates an operating method of a storage system according to one or more embodiments. FIG. 6 illustrates step S2001 of FIG. 5. FIG. 7 illustrates the HMB region of a host device according to one or more embodiments.

The storage device 200 determines whether it is necessary to change the HMB size (S2001).

Specifically, referring to FIG. 6 together, the storage device 200 detects a change in dynamic speed (S3001).

For example, when IO noise increases or decreases between the storage device 200 and the host device 100, the dynamic speed, that is, the communication speed, may change.

The storage device 200 determines whether the communication speed and frequency bandwidth increase (S3003).

If it is determined that the communication speed and frequency bandwidth increase, the storage device 200 determines whether it is necessary to increase the HMB size (S3005).

Specifically, the storage device 200 may compare the current HMB size with the target HMB size corresponding to the changed communication speed and changed bandwidth. If the target HMB size and the current HMB size are the same, the storage device 200 may determine that the HMB size does not need to be increased.

For example, referring to FIG. 7 together, it is assumed that the current HMB has a first size 701, and the HMB size corresponding to the current speed and bandwidth has a second size. When the first size 701 and the second size are the same, the storage device 200 may determine that there is no need to change the HMB size. If the first size 701 and the second size are different, the storage device 200 may determine to change the HMB size.

If it is determined that the HMB size does not need to be increased, the storage device 200 maintains the HMB ID (S2003).

That is, the storage device 200 may maintain the HMB ID so that the HMB maintains the first size 701.

Afterwards, the storage device 200 performs step S2001 again.

If it is determined that the HMB size should be increased, the storage device 200 changes the HMB ID (S2002).

Specifically, the storage device 200 may change the HMB ID so that the HMB 121 has the second size.

When the first size 701 is smaller than the second size, the storage device 200 may change the HMB ID so that the HMB has the second size. Accordingly, the host device 100 may additionally allocate host memory so that the HMB has a third size 705.

If it is determined that the communication speed and frequency bandwidth do not increase, the storage device 200 changes the HMB ID (S2002).

That is, the storage device 200 may determine that the communication speed and frequency bandwidth are decreasing. Accordingly, the storage device 200 may determine that the HMB size should be decreased. Referring to FIG. 7 together, when the first size 701 is larger than the second size, the storage device 200 may change the HMB ID so that the HMB has the second size. Accordingly, the host device 100 may allocate less host memory so that the HMB has the second size 703.

Afterwards, the storage device 200 determines the HMB ID (S2004).

The storage device 200 transmits an asynchronous event request (AER) to the storage device 200 (S2005).

Specifically, the storage device 200 may make necessary requests to the host device 100 using AER. For example, the storage device 200 may request the host device 100 to allocate the HMB 121.

The host device 100 transmits an identify command to the storage device 200 (S2007).

In response to receiving the identify command from the host device 100, the storage device 200 transmits the HMB ID to the host device 100 (S2009).

The host device 100 allocates the HMB 121 region (S2011).

Specifically, the host device 100 may allocate a portion of the region of the host memory 120 to the HMB 121 based on the received HMB ID.

The host device 100 generates HMDL (S2013).

The host device 100 transmits a set feature command to the storage device 200 (S2015).

The host device 100 transmits the HMDL to the storage device 200 (S2017).

The storage device 200 stores HMDL (S2019).

Afterwards, the storage device 200 transmits a completion response to the host device 100 (S2021).

The storage device 200 accesses the HMB 121 region (S2023).

Figure 8:
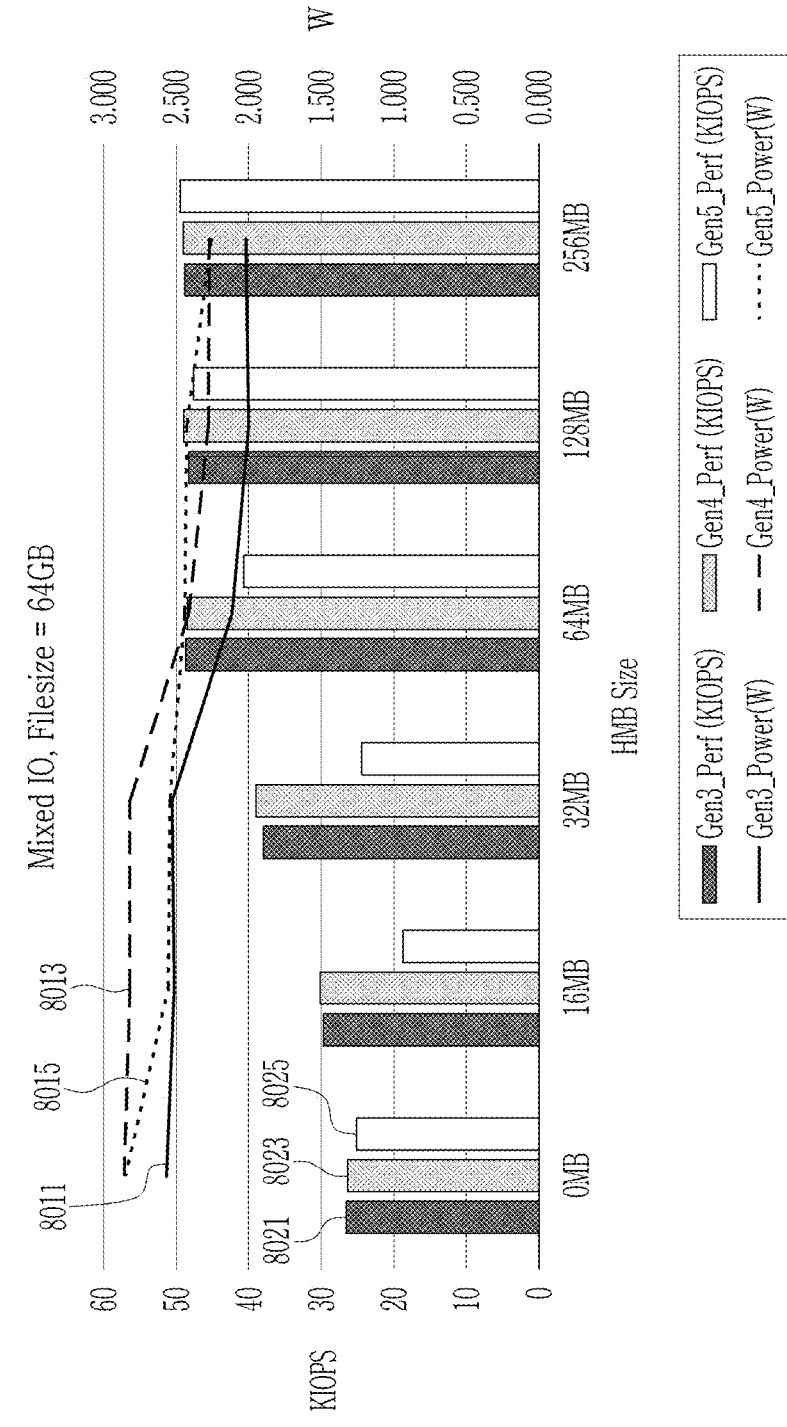
FIG. 8 is a graph illustrating performance and power according to HMB size and speed according to one or more embodiments.

FIG. 8 is a graph illustrating performance and power according to HMB size and speed according to one or more embodiments.

Specifically, FIG. 8 illustrates the performance and power of the storage device 200 when the file size is 64 GB and the host device 100 randomly reads or writes the storage device 200. Meanwhile, it is assumed that the maximum size of the HMB 121 that the host device 100 may allocate is 256 GB. Here, the HMB 121 may store approximately 1 GB of metadata per 1 MB.

The first graph 8011 is a graph showing the power consumed by the storage device 200 when the host device 100 and the storage device 200 communicate at the PCIe Gen 3 speed. The second graph 8013 is a graph showing the power consumed by the storage device 200 when the host device 100 and the storage device 200 communicate at the PCIe Gen 4 speed. The third graph 8015 is a graph showing the power consumed by the storage device 200 when the host device 100 and the storage device 200 communicate at the PCIe Gen 5 speed.

The first graph 8011 to the third graph 8015 are graphs showing power changes according to HMB size.

As shown in FIG. 8, when the HMB 121 has a size of 64 MB or 128 MB, the HMB 121 may consume more power when operating at Gen 5 speed than when operating at Gen 4 speed. However, if the HMB 121 has a size of 256 MB, similar power consumption may be consumed when operating at the Gen 5 speed and when operating at the Gen 4 speed.

When the storage device 200 operates at Gen 3 and Gen 4 speeds, the amount of power consumed until the HMB 121 has a size of 32 MB may be similar. However, as the size of the HMB 121 becomes larger than 32 MB, the amount of power consumed may decrease.

When the storage device 200 operates at Gen 5 speed, the amount of power consumed may decrease as the size of the HMB 121 increases.

A fourth graph 8021 shows the performance of the storage device 200 in IOPS (Input/Output Operations Per Second) units when the host device 100 and the storage device 200 communicate at the PCIe Gen 3 speed. A fifth graph 8023 represents the performance of the storage device 200 in IOPS units when the host device 100 and the storage device 200 communicate at the PCIe Gen 4 speed. A sixth graph 8025 shows the performance of the storage device 200 in IOPS units when the host device 100 and the storage device 200 communicate at the PCIe Gen 5 speed.

The fourth graph 8021 to the sixth graph 8025 show performance changes according to HMB size.

As shown in FIG. 8, since the file size is 64 GB, the performance of the storage device 200 when the HMB 121 has a size of 64 MB and the storage device 200 communicates at a communication speed of Gen 3 or Gen 4 may gradually saturates. Meanwhile, when the storage device 200 communicates at a Gen 5 communication speed, the performance of the storage device 200 may gradually improve.

Figure 9:
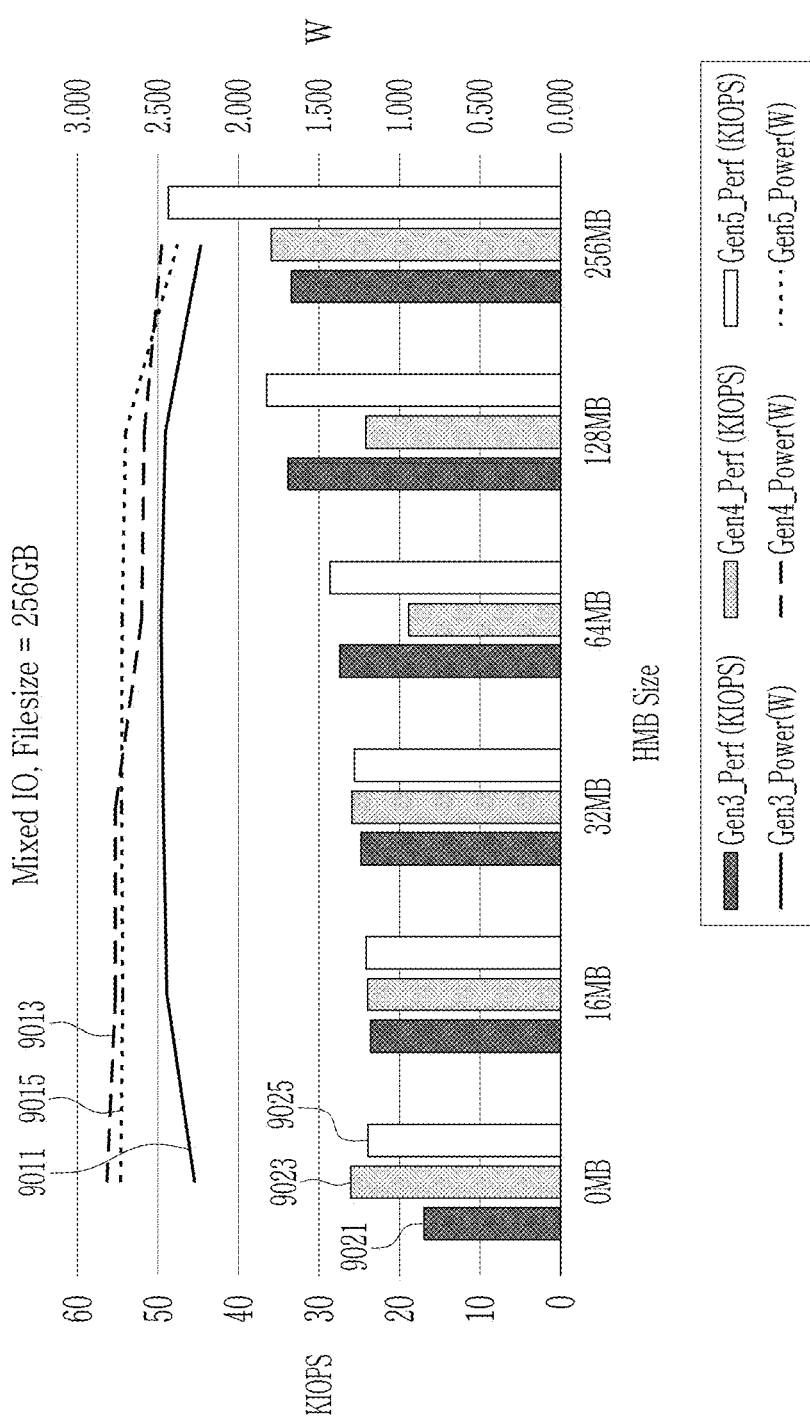
FIG. 9 is a graph illustrating performance and power according to HMB size and speed according to one or more embodiments.

FIG. 9 is a graph illustrating performance and power according to HMB size and speed according to one or more embodiments.

Specifically, FIG. 9 illustrates the performance and power of the storage device 200 when the file size is 64 GB and the host device 100 randomly reads or writes the storage device 200. Meanwhile, it is assumed that the maximum size of the HMB 121 that the host device 100 may allocate is 256 GB. Here, the HMB 121 may store approximately 1 GB of metadata per 1 MB.

A first graph 9011 is a graph showing the power consumed by the storage device 200 when the host device 100 and the storage device 200 communicate at the PCIe Gen 3 speed. A second graph 9013 is a graph showing the power consumed by the storage device 200 when the host device 100 and the storage device 200 communicate at the PCIe Gen 4 speed. The third graph 9015 is a graph showing the power consumed by the storage device 200 when the host device 100 and the storage device 200 communicate at the PCIe Gen 5 speed.

The first graph 9011 to the third graph 9015 are graphs showing power changes according to HMB size.

As shown in FIG. 8, when the HMB 121 has a size of 64 MB or 128 MB, the HMB 121 may consume more power when operating at Gen 5 speed than when operating at Gen 4 speed.

The load count to the HMB 121 after reading metadata from the non-volatile memory 400, according to the HMB size and speed, is as follows.

TABLE 1

| HMB Size | 0 MB | 16 MB | 32 MB | 64 MB | 128 MB | 256 MB |
|---|---|---|---|---|---|---|
| Gen3_load count | | 73109 | 59188 | 14816 | 1001 | 1001 |
| Gen4_load count | | 73859 | 59712 | 14901 | 1001 | 1001 |
| Gen5_load count | | 63357 | 56076 | 14656 | 1003 | 1002 |

That is, as shown in Table 1, when the storage device 200 operates at Gen 5 speed, the load count to the HMB 121 after reading metadata from the non-volatile memory 400 may be less than when operating at Gen 4 speed. Accordingly, if the HMB 121 has a size of 256 MB, operating at Gen 5 speed may consume less power than operating at Gen 4 speed.

A fourth graph 9021 shows the performance of the storage device 200 in IOPS units when the host device 100 and the storage device 200 communicate at the PCIe Gen 3 speed. A fifth graph 9023 represents the performance of the storage device 200 in IOPS units when the host device 100 and the storage device 200 communicate at the PCIe Gen 4 speed. A sixth graph 9025 shows the performance of the storage device 200 in IOPS units when the host device 100 and the storage device 200 communicate at the PCIe Gen 5 speed.

The fourth graph 9021 to the sixth graph 9025 show performance changes according to HMB size.

As shown in FIG. 9, performance may be improved as the HMB size increases. However, when operating at Gen 3 speed, performance may be saturated if the HMB 121 has a size of 32 MB.

Figure 10:
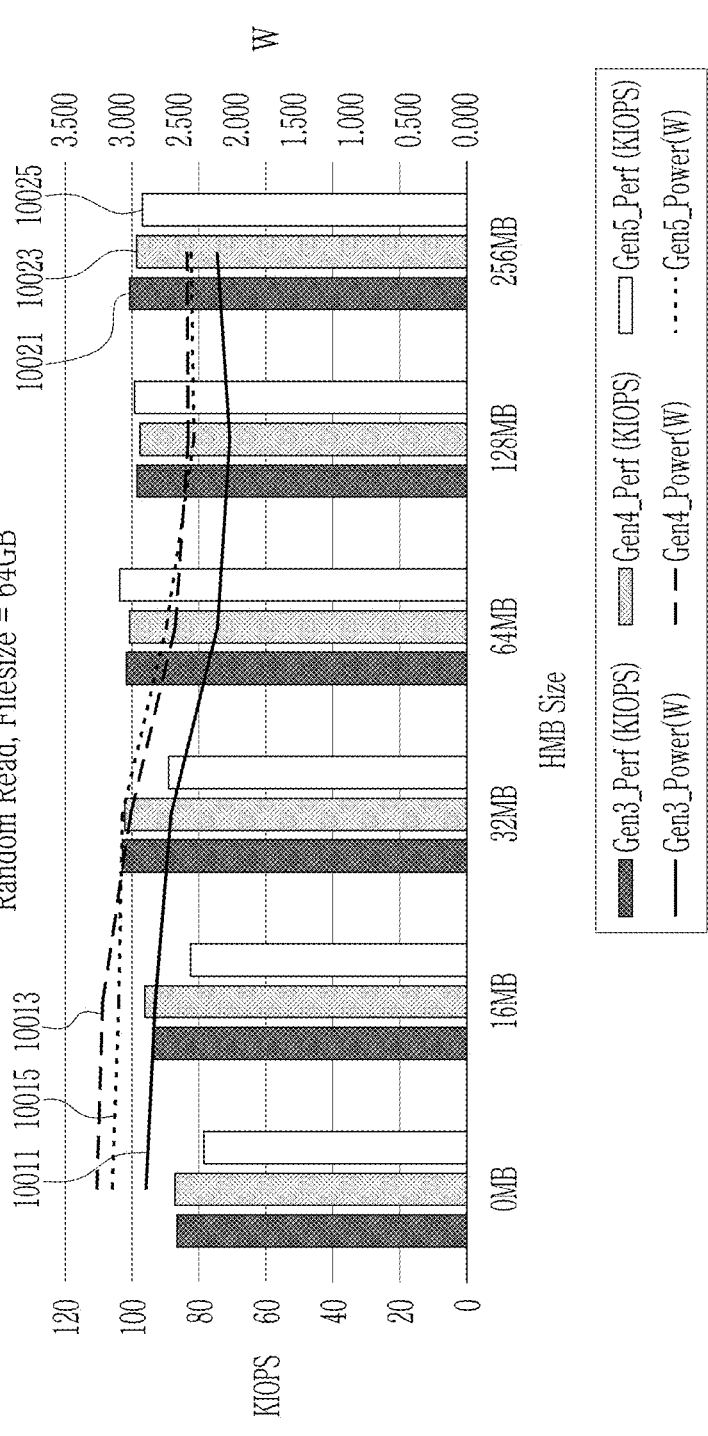
FIG. 10 is a graph illustrating performance and power according to HMB size and speed according to one or more embodiments.

FIG. 10 is a graph illustrating performance and power according to HMB size and speed according to one or more embodiments.

Specifically, FIG. 10 illustrates the performance and power of the storage device 200 when the file size is 64 GB and the host device 100 randomly reads the storage device 200. Meanwhile, it is assumed that the maximum size of the HMB 121 that the host device 100 may allocate is 256 GB. Here, the HMB 121 may store approximately 1 GB of metadata per 1 MB.

A first graph 10011 is a graph showing the power consumed by the storage device 200 when the host device 100 and the storage device 200 communicate at the PCIe Gen 3 speed. A second graph 10013 is a graph showing the power consumed by the storage device 200 when the host device 100 and the storage device 200 communicate at the PCIe Gen 4 speed. The third graph 10015 is a graph showing the power consumed by the storage device 200 when the host device 100 and the storage device 200 communicate at the PCIe Gen 5 speed.

The first graph 10011 to the third graph 10015 are graphs showing power changes according to HMB size.

A fourth graph 10021 shows the performance of the storage device 200 in IOPS units when the host device 100 and the storage device 200 communicate at the PCIe Gen 3 speed. A fifth graph 10023 represents the performance of the storage device 200 in IOPS units when the host device 100 and the storage device 200 communicate at the PCIe Gen 4 speed. A sixth graph 10025 shows the performance of the storage device 200 in IOPS units when the host device 100 and the storage device 200 communicate at the PCIe Gen 5 speed.

The fourth graph 10021 to the sixth graph 10025 show performance changes according to HMB size.

As shown in FIG. 10, as the HMB size increases, the amount of power consumed may decrease and performance may be improved. Meanwhile, when the storage device 200 operates at Gen 5 speed, the amount of power consumed when the HMB 121 has a size of 128 MB may be reduced compared to the amount of power consumed when the HMB 121 has a size of 256 MB.

FIG. 11 is a graph illustrating performance and power according to HMB size and speed according to one or more embodiments.

Specifically, FIG. 11 illustrates the performance and power of the storage device 200 when the file size is 256 GB and the host device 100 randomly reads the storage device 200. Meanwhile, it is assumed that the maximum size of the HMB 121 that the host device 100 may allocate is 256 GB. Here, the HMB 121 may store approximately 1 GB of metadata per 1 MB.

A first graph 11011 is a graph showing the power consumed by the storage device 200 when the host device 100 and the storage device 200 communicate at the PCIe Gen 3 speed. A second graph 11013 is a graph showing the power consumed by the storage device 200 when the host device 100 and the storage device 200 communicate at the PCIe Gen 4 speed. A third graph 11015 is a graph showing the power consumed by the storage device 200 when the host device 100 and the storage device 200 communicate at the PCIe Gen 5 speed.

The first graph 11011 to the third graph 11015 are graphs showing power changes according to HMB size.

A fourth graph 11021 shows the performance of the storage device 200 in IOPS units when the host device 100 and the storage device 200 communicate at the PCIe Gen 3 speed. A fifth graph 11023 represents the performance of the storage device 200 in IOPS units when the host device 100 and the storage device 200 communicate at the PCIe Gen 4 speed. A sixth graph 11025 shows the performance of the storage device 200 in IOPS units when the host device 100 and the storage device 200 communicate at the PCIe Gen 5 speed.

The fourth graph 11021 to the sixth graph 11025 show performance changes according to HMB size.

Referring to FIG. 11, as the HMB size increases, the amount of power consumed may decrease. Meanwhile, when the storage device 200 operates at Gen 5 speed, the amount of power consumed when the HMB 121 has a size of 256 MB may be reduced compared to the amount of power consumed when the HMB 121 has a size of 128 MB.

Figure 12:
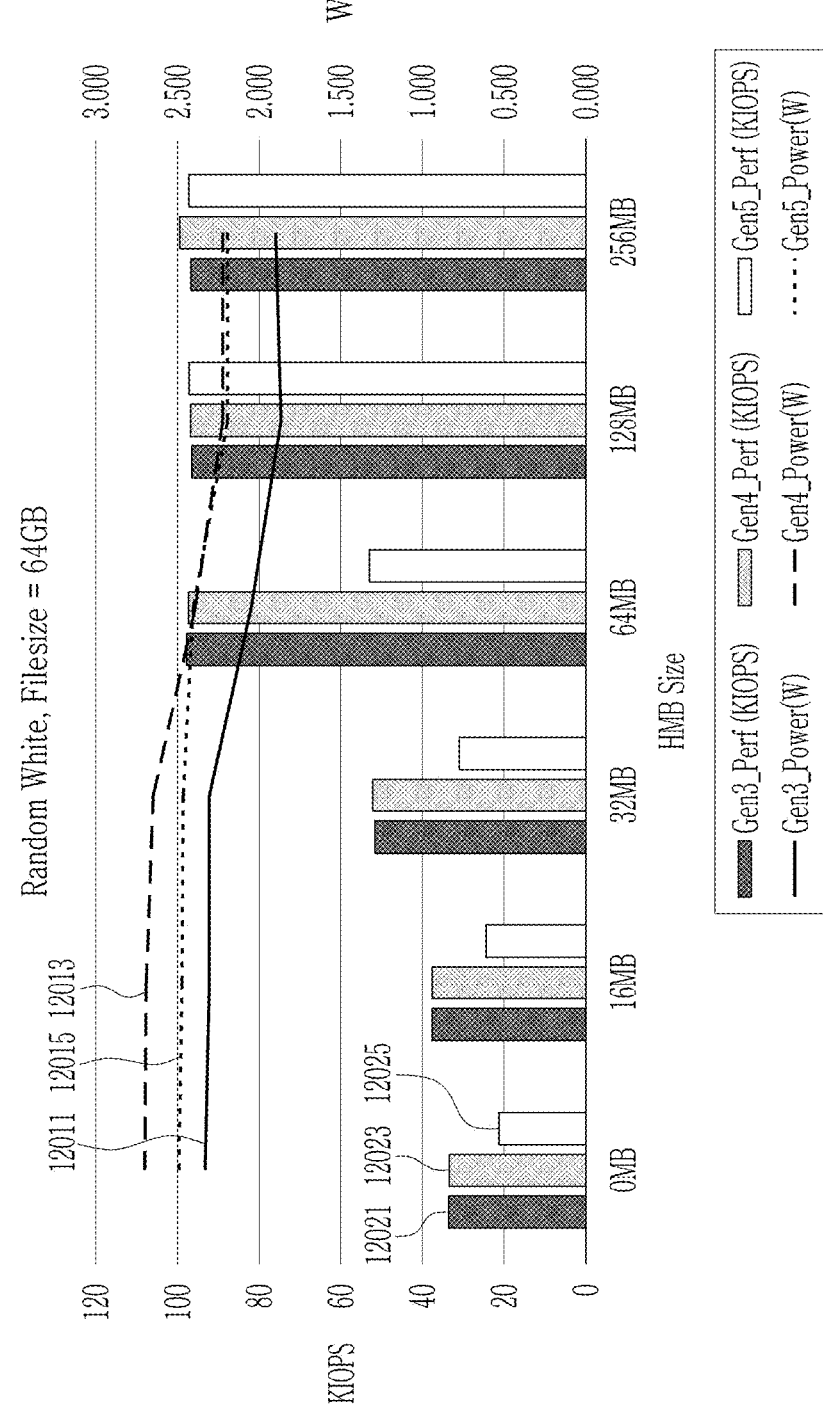
FIG. 12 is a graph illustrating performance and power according to HMB size and speed according to one or more embodiments.

FIG. 12 is a graph illustrating performance and power according to HMB size and speed according to one or more embodiments.

Specifically, FIG. 12 is a diagram showing the performance and power of the storage device 200 when the file size is 64 GB and the host device 100 randomly writes data to the storage device 200. Meanwhile, it is assumed that the maximum size of the HMB 121 that the host device 100 may allocate is 256 GB. Here, the HMB 121 may store approximately 1 GB of metadata per 1 MB.

A first graph 12011 is a graph showing the power consumed by the storage device 200 when the host device 100 and the storage device 200 communicate at the PCIe Gen 3 speed. A second graph 12013 is a graph showing the power consumed by the storage device 200 when the host device 100 and the storage device 200 communicate at the PCIe Gen 4 speed. A third graph 12015 is a graph showing the power consumed by the storage device 200 when the host device 100 and the storage device 200 communicate at the PCIe Gen 5 speed.

The first graph 12011 to the third graph 12015 are graphs showing power changes according to HMB size.

When the HMB has a size of 64 MB, the amount of power consumed when the storage device 200 operates at Gen 5 speed may be similar to when the storage device 200 operates at Gen 4 speed.

A fourth graph 12021 shows the performance of the storage device 200 in IOPS units when the host device 100 and the storage device 200 communicate at the PCIe Gen 3 speed. A fifth graph 12023 represents the performance of the storage device 200 in IOPS units when the host device 100 and the storage device 200 communicate at the PCIe Gen 4 speed. A sixth graph 12025 shows the performance of the storage device 200 in IOPS units when the host device 100 and the storage device 200 communicate at the PCIe Gen 5 speed.

The fourth graph 12021 to the sixth graph 12025 show performance changes according to HMB size.

Figure 13:
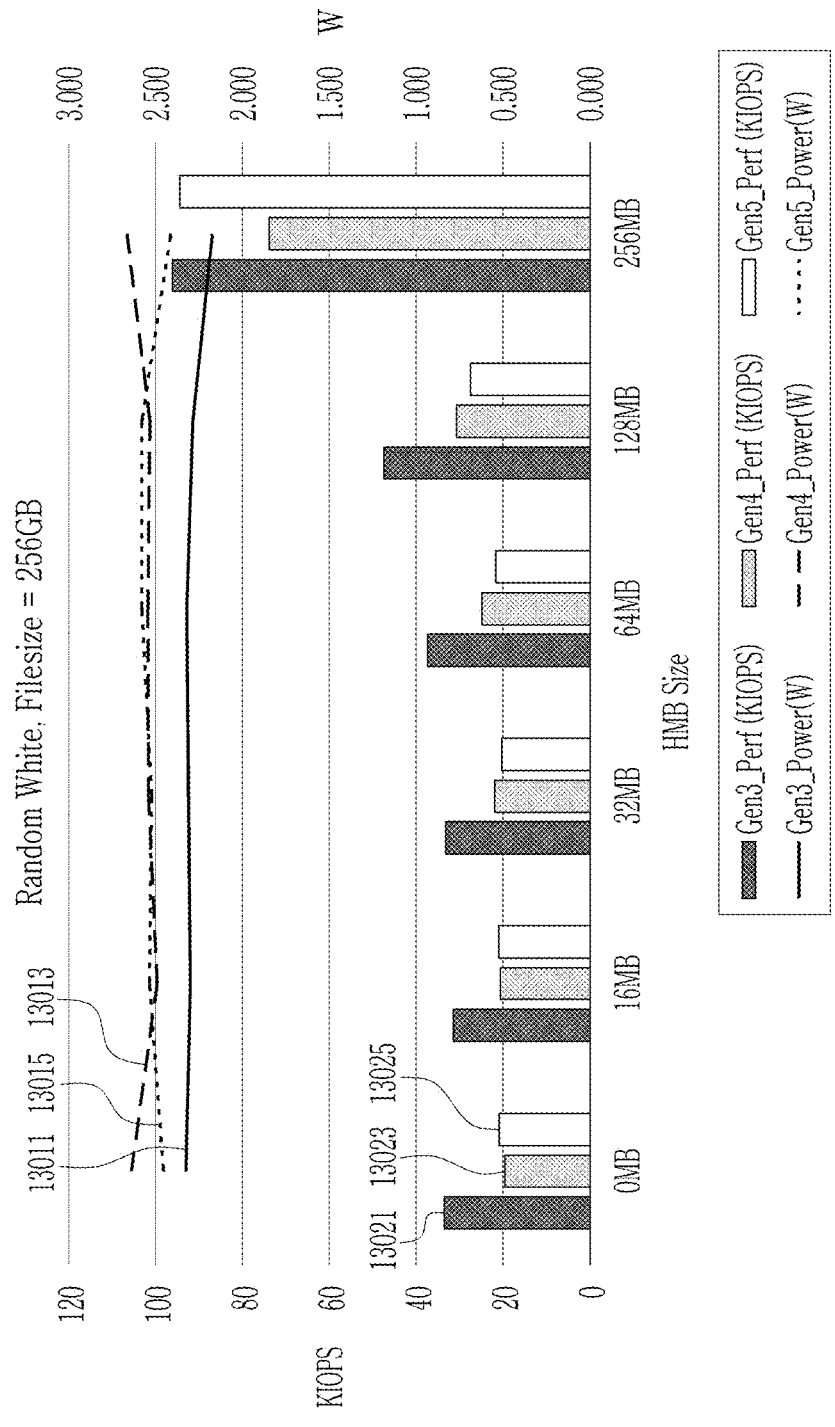
FIG. 13 is a graph illustrating performance and power according to HMB size and speed according to one or more embodiments.

As shown in FIG. 13, when the storage device 200 operates at Gen 5 speed and the HMB has a size of 64 MB, the performance of the storage device 200 may not be saturated. When the storage device 200 operates at Gen 5 speed and the HMB 121 has a size larger than 128 MB, the storage device 200 may have similar power consumption and similar performance as when the storage device 200 operates at the speed of Gen 4.

FIG. 13 is a graph illustrating performance and power according to HMB size and speed according to one or more embodiments.

Specifically, FIG. 13 is a diagram showing the performance and power of the storage device 200 when the file size is 256 GB and the host device 100 randomly writes data to the storage device 200. Meanwhile, it is assumed that the maximum size of the HMB 121 that the host device 100 may allocate is 256 GB. Here, the HMB 121 may store approximately 1 GB of metadata per 1 MB.

A first graph 13011 is a graph showing the power consumed by the storage device 200 when the host device 100 and the storage device 200 communicate at the PCIe Gen 3 speed. A second graph 13013 is a graph showing the power consumed by the storage device 200 when the host device 100 and the storage device 200 communicate at the PCIe Gen 4 speed. A third graph 13015 is a graph showing the power consumed by the storage device 200 when the host device 100 and the storage device 200 communicate at the PCIe Gen 5 speed.

The first graph 13011 to the third graph 13015 are graphs showing power changes according to HMB size.

A fourth graph 13021 shows the performance of the storage device 200 in IOPS units when the host device 100 and the storage device 200 communicate at the PCIe Gen 3 speed. A fifth graph 13023 represents the performance of the storage device 200 in IOPS units when the host device 100 and the storage device 200 communicate at the PCIe Gen 4 speed. A sixth graph 13025 shows the performance of the storage device 200 in IOPS units when the host device 100 and the storage device 200 communicate at the PCIe Gen 5 speed.

The fourth graph 13021 to the sixth graph 13025 are graphs showing performance changes according to HMB size.

As shown in FIG. 13, performance may be improved as the HMB size increases. However, when the HMB 121 has a size of 16 MB to 64 MB and the storage device 200 operates at Gen 5 speed, performance may not significantly improve, but the amount of power consumed may increase.

FIGS. 8 to 13 show power and performance according to HMB size and speed when the host device 100 randomly reads data from the storage device 200 or writes data randomly to the storage device 200. As shown in FIGS. 8 to 13, the performance and power of the storage device 200 may be affected by the HMB size. Meanwhile, the size of HMB with optimal performance and power may vary depending on speed. In general, as the communication speed of the storage device 200 increases and the HMB size increases, performance may improve and the amount of power consumed may decrease.

Based on the experimental results in FIGS. 8 to 13, the optimal HMB size corresponding to the minimum size of the HMB, maximum size of the HMB 121, target workload size, communication speed, PCIe bandwidth, etc. may be determined. The optimal HMB size may be set in advance as HMB size data.

Figure 14:
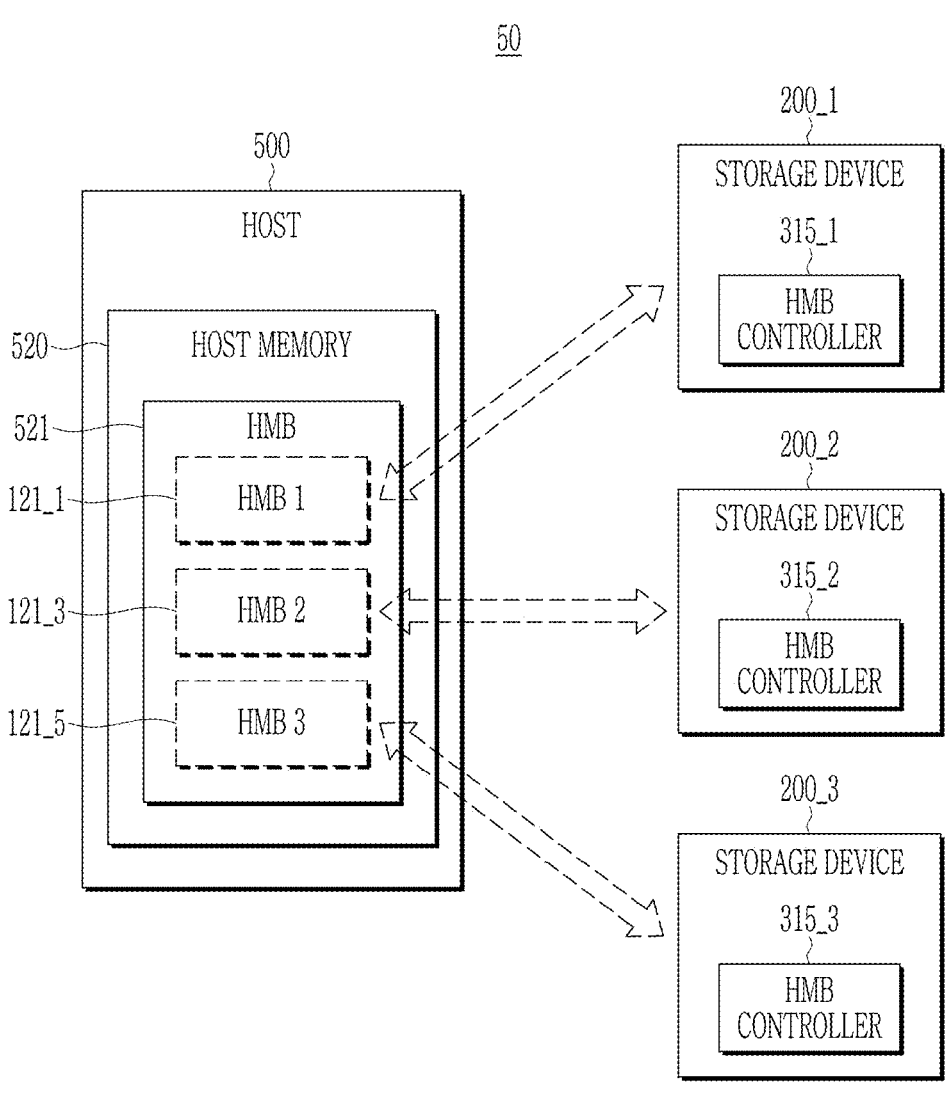
FIG. 14 illustrates a storage system according to one or more embodiments.

FIG. 14 illustrates a storage system according to one or more embodiments.

As shown in FIG. 14, a storage system 50 includes a host device 500 and a plurality of storage devices 200_1, 200_2, and 200_3.

The host device 500 may control the overall operation of the storage system 50. The host device 500 may include a host controller and a host memory 520.

The host memory 520 may include a plurality of HMBs 121_1, 121_3, and 121_5. In some embodiments, the host device 500 may allocate a partial region of the host memory 520 to a plurality of HMBs 121_1, 121_3, and 121_5. The plurality of HMBs 121_1, 121_3, and 121_5 may be regions of the host memory 520 allocated to the plurality of storage devices 200_1, 200_2, and 200_3. In some embodiments, each of HMB 121_1, HMB 121_3, and HMB 121_5 may be allocated consecutive addresses. Meanwhile, the address allocated to the HMB 121_1, the address allocated to the HMB 121_3, and the address allocated to the HMB 121_5 may not be consecutive to each other.

Each of the plurality of HMBs 121_1, 121_3, and 121_5 may be controlled by a corresponding storage device among the plurality of storage devices 200_1, 200_2, and 200_3. Each of the plurality of HMBs 121_1, 121_3, and 121_5 may be monitored by a corresponding storage device among the plurality of storage devices 200_1, 200_2, and 200_3.

The storage device 200_1 may include an HMB controller 315_1. The HMB controller 315_1 may manage the HMB 121_1. The HMB controller 315_1 may monitor the communication speed between the host device 500 and the storage device 200_1. The HMB controller 315_1 may generate an HMB ID based on the monitoring results.

Specifically, the HMB controller 315_1 may determine the target size of the HMB 121_1 based on the communication speed. The HMB controller 315_1 may transmit the determined size of the HMB 121_1 to the host device 500 as an HMB ID. The host device 500 may allocate a portion of the host memory 520 as the region of the HMB 121_1 based on the HMB ID.

In some embodiments, HMB controller 315_1 may change the target size of the HMB 121_1 based on changes in communication speed. In some embodiments, the HMB controller 315_1 may notify the host device 500 that the size of the HMB 121_1 has changed. Accordingly, the host device 500 may reallocate the region of the HMB 121 in the host memory 520.

Meanwhile, the HMB controller 315_1 may generate an HMB ID based on the size of the non-volatile memory in the storage device 200_1.

The host device 500 may allocate a corresponding HMB region based on each of the plurality of HMB IDs received from the plurality of storage devices 200_1, 200_2, and 200_3.

Figure 15:
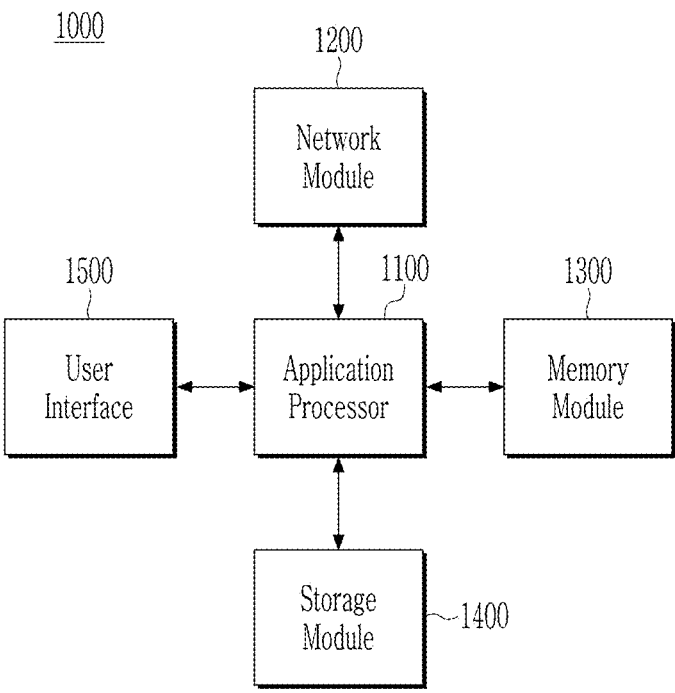
FIG. 15 is a block diagram exemplarily showing a mobile system to which a storage system according to one or more embodiments is applied.

FIG. 15 is a block diagram exemplarily showing a mobile system to which a storage system according to one or more embodiments is applied.

Referring to FIG. 15, a mobile system 1000 includes an application processor 1100, a memory module 1300, a network module 1200, a storage module 1400, and a user interface 1500. The application processor 1100 may correspond to the host device 100 of FIG. 1. In some embodiments, the application processor 1100 may include a host memory buffer region allocated to the storage module 1400.

The memory module 1300 may operate as the main memory, operating memory, buffer memory, or cache memory of the mobile system 1000. The memory module 1300 may include volatile random access memory such as DRAM, SDRAM, DDR SDRAM, DDR2 SDRAM, DDR3 SDRAM, LPDDR SDARM, LPDDR3, SDRAM, LPDDR3 SDRAM, or non-volatile random access memory such as PRAM, ReRAM, MRAM, FRAM, etc.

The network module 1200 may communicate with external devices. For example, the network module 1200 may support code division multiple access (CDMA), global system for mobile communication (GSM), wideband CDMA (WCDMA), CDMA-2000, time division multiple access (TDMA), long term evolution (LTE), Wimax, WLAN, UWB, Bluetooth, WI-DI, etc.

The storage module 1400 may store data. For example, the storage module 1400 may store data received from the outside. Alternatively, the storage module 1400 may transmit data stored in the storage module 1400 to the application processor 1100. For example, the storage module 1400 may be implemented as a non-volatile semiconductor memory device such as phase-change RAM (PRAM), magnetic RAM (MRAM), resistive RAM (RRAM), NAND flash, NOR flash, or three-dimensional NAND flash. For example, the storage module 1400 may be provided as a solid state drive (SSD), multimedia card (MMC), embedded multimedia card (eMMC), universal flash storage (UFS), etc.

The storage module 1400 may determine the size of the host memory buffer region based on the communication speed with the application processor 1100 and the capacity of the non-volatile semiconductor memory device within the storage module 1400. The storage module 1400 may change operations for controlling non-volatile semiconductor memory devices based on the size of the host memory buffer region. For example, the storage module 1400 may set the size of metadata flushed from the host memory buffer to the non-volatile semiconductor memory device based on the size of the host memory buffer region.

The storage module 1400 determines the size of the host memory buffer region based on the communication speed with the application processor 1100 and the capacity of the non-volatile semiconductor memory device, so power consumption during operation may be reduced and performance may be improved.

While the embodiments of the present disclosure have been described in detail, it is to be understood that the disclosure is not limited to the disclosed embodiments, but on the contrary, is intended to cover various modifications and equivalent arrangements included within the spirit and scope of the appended claims.

What is claimed is:

1. An operating method of a storage system, comprising:
 establishing communication with a host device comprising a host memory;
 determining a host memory buffer (HMB) information instructing the host device to allocate a portion of the host memory as an HMB region having a size based on a communication speed between the host device and a storage device;
 transmitting an asynchronous event request (AER) requesting allocation of the HMB region to the host device; and
 accessing the HMB region allocated based on the HMB information,
 wherein the determining of the HMB information comprises:
 generating a first HMB information instructing to set the size of the HMB region as a first size corresponding to a first speed based on the communication speed being the first speed; and generating a second HMB information instructing to set the size of the HMB region as a second size corresponding to a second speed based on the communication speed being changed from the first speed to the second speed.

2. The operating method of the storage system of claim 1, wherein the second size is greater than the first size based on the second speed being faster than the first speed, and wherein the second size is smaller than the first size based on the second speed being slower than the first speed.

3. A storage system, comprising:

a storage device comprising a non-volatile memory and configured to:

monitor a communication speed between a host device and the storage device, generate a first host memory buffer (HMB) information instructing to set a size of an HMB as a first size corresponding to a first speed, based on the communication speed being the first speed, and transmit the first HMB information to the host device, wherein the host device comprises a host memory and is configured to:

set the size of the HMB based on the first HMB information, and allocate a first portion of the host memory as the HMB corresponding to the first size, wherein the storage device is further configured to:

detect that the communication speed changes from the first speed to a second speed, generate a second HMB information corresponding to the second speed, and transmit the second HMB information to the host device, and wherein the host device is further configured to reallocate a second portion of the host memory as the HMB based on the second HMB information.

4. The storage system of claim 3, wherein the storage device is configured to:

transmit an asynchronous event request (AER) instructing to change from the first HMB information to the second HMB information, to the host device.

5. The storage system of claim 3, wherein the second portion of the host memory is larger than the first size based on the second speed being faster than the first speed.

6. The storage system of claim 3, wherein the second portion of the host memory is smaller than the first size based on the second speed being slower than the first speed.

7. The storage system of claim 3, wherein the first HMB information and the second HMB information comprise at least one of a minimum size of the HMB, a maximum size of the HMB, and the communication speed.

8. A storage device, comprising:

a host interface connected to a host device and configured to transmit and receive a plurality of packets;

a non-volatile memory; and a host memory buffer (HMB) controller configured to:

monitor a communication speed between the storage device and the host device, determine a size of an HMB region allocated from the host device as a first size corresponding to a first speed based on the communication speed being the first speed and predetermined HMB size data comprising the size of the HMB region corresponding to the communication speed;

buffer metadata for the non-volatile memory in the HMB region;

instruct the host interface to transmit the size of the HMB region to the host device; and based on the communication speed being changed from the first speed to a second speed, determine the size of the HMB region as a second size corresponding to the second speed.

9. The storage device of claim 8, wherein the second size is greater than the first size based on the second speed being faster than the first speed.

10. The storage device of claim 8, wherein the second size is smaller than the first size based on the second speed being slower than the first speed.

11. The storage device of claim 8, further comprising:

at least one central processing unit (CPU) configured to control the non-volatile memory in response to a request from the host device, wherein the at least one CPU is further configured to set a size of the metadata to be flushed from the HMB to the non-volatile memory based on the size of the HMB region.

12. The storage device of claim 8, further comprising:

a flash translate layer (FTL) configured to generate mapping data between a logical address received from the host device and a physical address of the non-volatile memory, wherein the metadata comprises the mapping data.

13. The storage device of claim 8, wherein the storage device is configured to transmit an asynchronous event request (AER) requesting allocation of an HMB having the size of the HMB region to the host device through the host interface.

* * * * *